J. R. McLAUGHLIN.
PROCESS OF MAKING SHOES.
APPLICATION FILED FEB. 10, 1917.
1,276,090.
Patented Aug. 20, 1918.
3 SHEETS—SHEET 1.
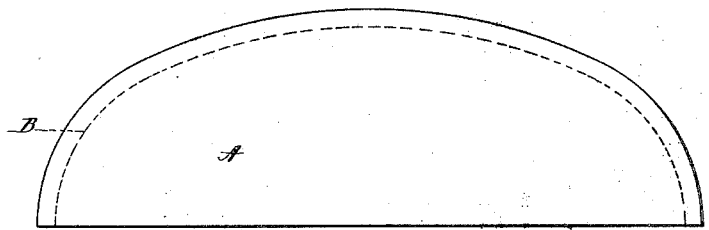
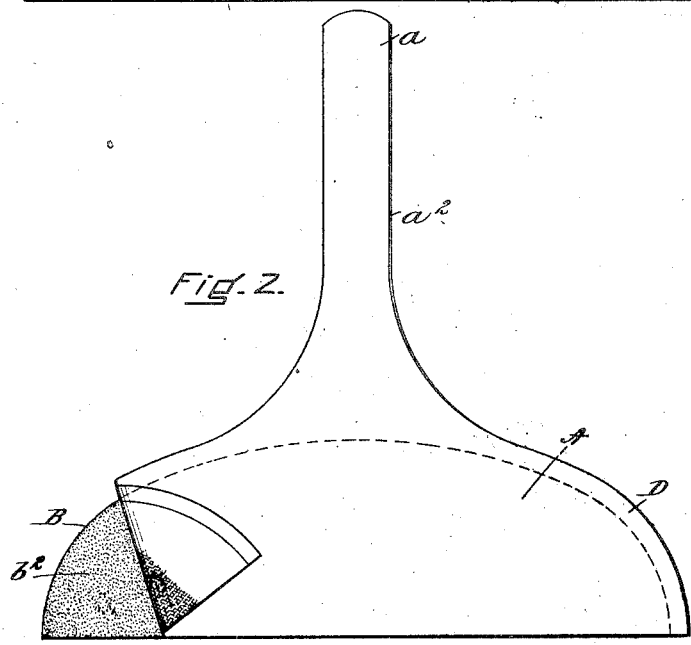
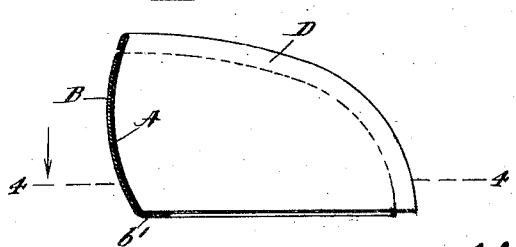
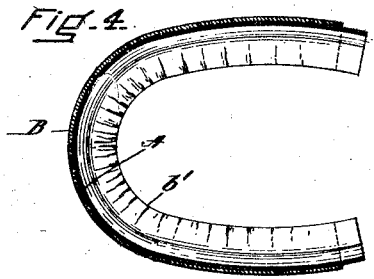
John R. McLaughlin INVENTOR=
BY
HIS ATTORNEY=

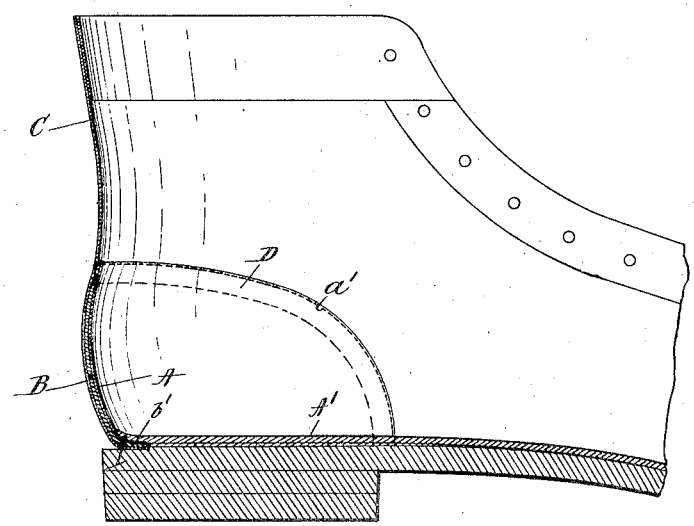
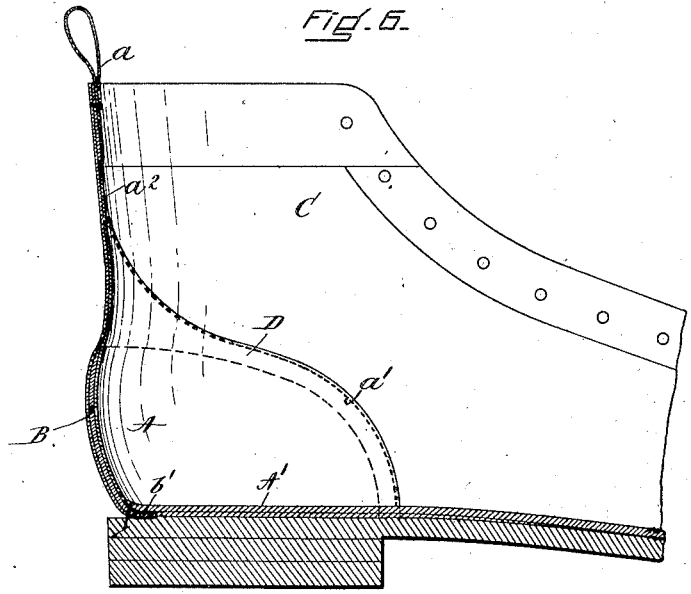
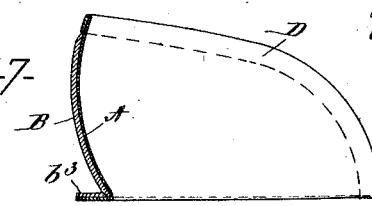

J. R. McLAUGHLIN.
PROCESS OF MAKING SHOES.
APPLICATION FILED FEB. 10, 1917.
1,276,090.
Patented Aug. 20, 1918.
3 SHEETS—SHEET 3.
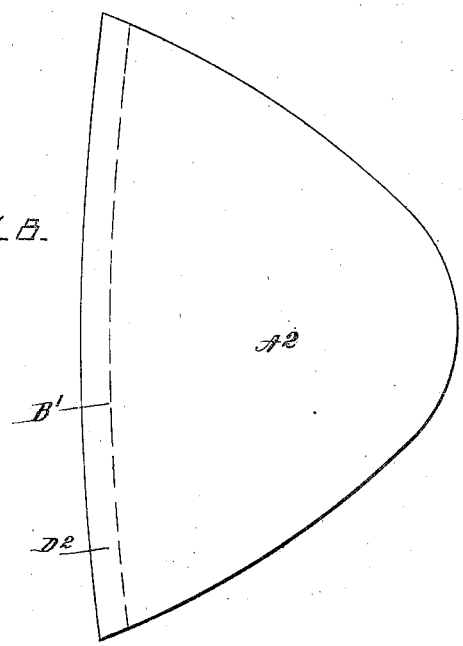
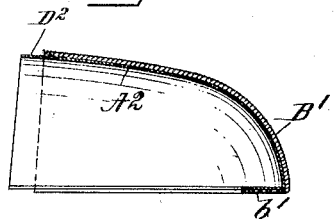
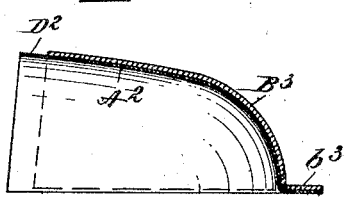
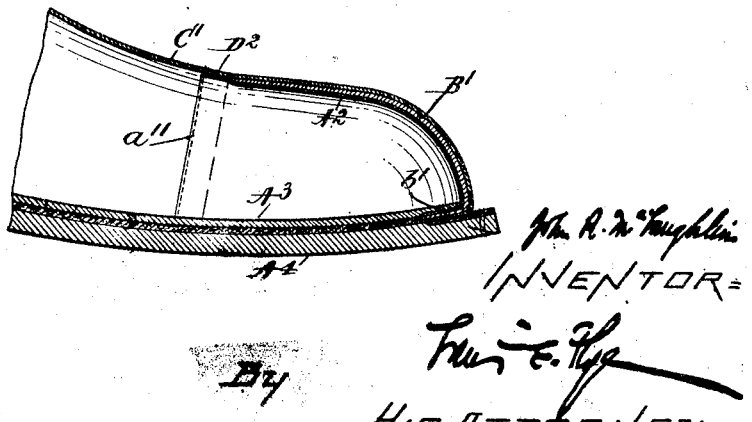

UNITED STATES PATENT OFFICE.

JOHN R. McLAUGHLIN, OF HOLBROOK, MASSACHUSETTS, ASSIGNOR OF ONE-HALF TO GEORGE E. ROLLINS, OF BROCKTON, MASSACHUSETTS.

PROCESS OF MAKING SHOES.

1,276,090.

Specification of Letters Patent.

Patented Aug. 20, 1918.

Application filed February 10, 1917. Serial No. 147,926.

*To all whom it may concern:*

Be it known that I, JOHN R. MCLAUGHLIN, a citizen of the United States, and a resident of Holbrook, Norfolk county, Massachusetts, have invented an Improvement in Processes of Making Shoes, of which the following description, in connection with the accompanying drawings, is a specification.

This invention relates particularly to the method of incorporating linings and retainers for heel counters and toe boxes in boots and shoes, which serve the double purpose of covering the counter and toe box and of providing retaining means for holding the counter and toe box firmly in place and the method of making the same. My invention will be best understood by reference to the following specification when taken in connection with the accompanying drawings, while its scope will be more particularly pointed out in the appended claim.

In the drawings—

Figure 1 is a plan of a blank prepared according to the first step in the method of making the lining and retainer for a heel counter.

Fig. 2 is a plan of a blank as in Fig. 1 and showing the lining and retainer for heel counter extended to serve as a back-stay and loop.

Fig. 3 is a longitudinal section of lining and retainer together with the counter in molded form.

Fig. 4 is a section on line 4—4 of Fig. 3.

Fig. 5 is a partial section of a shoe embodying my improvements in section.

Fig. 6 is a view similar to Fig. 5 and showing the extension of the lining and retainer to form back-stay and loop in section.

Fig. 7 is a section of a counter together with a lining and retainer having an out-turned bottom flange.

Figs. 8, 9, 10 and 11 illustrate in similar manner the embodiments of my improvement as relating to toe boxes in boots and shoes.

Fig. 8 is a plan of a blank prepared according to the first step in the method of making the lining and retainer for a toe box.

Fig. 9 is a longitudinal section of lining and retainer together with toe box in molded form with an in-turned bottom flange.

Fig. 10 is a similar view showing an out-turned bottom flange.

Referring to the drawings, I have here shown a blank A with and without extensions $a$, $a^2$, and in either form attached by a suitable adhesive $b^2$ to a blank for a counter B then molded into form with the counter B. The lining and retainer A is designed to extend above the upper edge of the counter B leaving an upper marginal flange D for attachment by stitching $a^1$ to the upper C. The bottom edge of the lining and retainer coincides with the edge portion of an in-turned or out-turned bottom flange of a shoe counter as, for example, $b^1$ and $b^3$ and with said bottom flange of the counter is lasted into the shoe.

According to the preferred method of making the described lining and retainer for shoe counters or toe boxes, I first prepare a blank A or $A^2$ of appropriate flexible material such, for example, as leather, cloth or fiber, whose edges will be binded or folded in the customary manned. After the blank has been thus prepared, it is then secured by suitable adhesive substance or otherwise appropriately attached to the inner face of a counter or toe box piece in such manner that in providing for a counter lining and retainer the curved edge of the lining piece will extend above the curved edge of the counter piece, and its straight edge will coincide with the straight edge of the counter piece, and in providing for a toe box lining and retainer, the straight edge of the lining piece will extend beyond the straight edge of the toe box piece and the curved edge of the lining piece will coincide with the curved edge of the toe box piece. The curved edge extension for counters may be a narrow margin D to be used solely as an attaching flange or may be extended and elongated sufficiently to serve as a back-stay $a^2$ and pull loop $a$; but in any event, the extensions D and $D^2$, of whatever shape or size, are to serve the purpose of a flange for engagement with the upper C or the vamp $C^1$ of the shoe. After the lining and retainer has been thus affixed to the counter or toe box piece it is then with the counter or toe box piece shaped or molded by appropriate instrumentalities into the form in which the counter or toe box is generally used, having then as a counter lining and retainer an up-standing portion as shown in Figs. 3, 5, 6, and 7 corresponding with the up-standing portion of the counter, but extending above the upper edge of the counter and in the counter and toe box having a lower flange portion $b^1$ and $b^3$, corresponding with either an in-turned or out-turned flange portion of the counter or toe box. The portion D of the lining and retainer extending above the upper edge of the counter is then stitched $a^1$ into the upper of a shoe, and in the case of the toe box the portion $D^2$ of the lining and retainer extending beyond the upper curved edge is then stitched $a^{11}$ into the vamp of a shoe, and the lower flange portion $b^1$ or $b^3$ is then lasted with the in-turned or out-turned flange of the counter or toe box into the shoe.

It should here be pointed out that before my invention, the lining intended to cover the counter was first stitched into the upper of the shoe and the counter in its finished form was inserted between the upper of the shoe and the counter lining after cement had been placed on the counter and lining and then the lining was worked into shape over the counter and both of them held in place with considerable difficulty and much slipping until the counter and the lining were lasted together into the shoe. The slipping and stretching of the upper of the shoe and of the lining incident to the lasting by the old method just described is avoided in the use of my method and with my lining and retainer, with the result that the quarters of the uppers of the shoe are sure to be even and the lining and retainer is certain to be smooth, and all of these desirable results are obtained through my method with a substantial saving of time and labor. The same improvement in method, facility of handling, and results is accomplished in a corresponding manner over the method heretofore in vogue, in connection with providing a lining for toe boxes.

My method is superior to the old method in providing a smoother covering for the counter and toe box and in providing means for retaining the counter and toe box more firmly and more evenly in place, thus making it possible to last the shoe more easily and more quickly and with better results.

While I have herein shown and described two specific forms or embodiments of my invention for illustrative purposes, and have shown and discussed in detail the construction and arrangement incident to two specific applications thereof, it is to be understood that the invention is to be limited neither to the mere details or relative arrangement of parts nor to the specific embodiments herein shown, but that extensive deviations from the illustrated forms and embodiments of the invention may be made without departing from the principles thereof.

Having described my invention, what I claim and desire to procure by Letters Patent is—

That improvement in the art of making shoes comprising the steps of forming a lining and retainer so that it may be fitted to a shoe stiffener piece, cementing the lining and retainer to the stiffener piece, then simultaneously molding the lining and retainer and the stiffener piece into any desired contour in such manner as to form a bottom flange and leave a margin of the lining and retainer extending beyond the upper edge portion of the stiffener, thereby making a flange for engagement with the upper of the shoe, and having the bottom edge of the lining and retainer coincide with the edge portion of the bottom flange of the shoe stiffener, then stitching said flange of the lining and retainer to the upper of the shoe, and then lasting the bottom portion of the lining and retainer together with the flange of the shoe stiffener.

In witness whereof, I have affixed my signature in the presence of two witnesses.

JOHN R. McLAUGHLIN.

Witnesses:
 MARGARET HIGGINS,
 DERINA WATTS.